(12) United States Patent
Jeong et al.

(10) Patent No.: US 8,799,741 B2
(45) Date of Patent: Aug. 5, 2014

(54) METHOD OF TRANSMITTING ETHERNET FRAME IN NETWORK BRIDGE AND THE BRIDGE

(75) Inventors: Hong Kyu Jeong, Yongin-si (KR); Geoffrey M. Garner, Red Bank, NJ (US); Hyun Surk Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 539 days.

(21) Appl. No.: 13/029,802

(22) Filed: Feb. 17, 2011

(65) Prior Publication Data

US 2011/0149970 A1 Jun. 23, 2011

Related U.S. Application Data

(62) Division of application No. 11/591,591, filed on Nov. 2, 2006, now Pat. No. 7,908,540.

(30) Foreign Application Priority Data

Jun. 29, 2006 (KR) ........................ 10-2006-0059782

(51) Int. Cl.
*H03M 13/00* (2006.01)
(52) U.S. Cl.
USPC ........................................................ 714/758
(58) Field of Classification Search
USPC ........................................................ 714/758
See application file for complete search history.

(56) References Cited

U.S. PATENT DOCUMENTS

| | | | |
|---|---|---|---|
| 5,237,593 A * | 8/1993 | Fisher et al. | 375/367 |
| 5,703,882 A | 12/1997 | Jung et al. | |
| 6,028,845 A * | 2/2000 | Serikawa et al. | 370/249 |
| 6,144,668 A | 11/2000 | Bass et al. | |
| 6,167,444 A * | 12/2000 | Boden et al. | 709/223 |
| 6,349,138 B1 | 2/2002 | Doshi et al. | |
| 6,603,769 B1 | 8/2003 | Thubert et al. | |
| 6,647,518 B1 | 11/2003 | Asmanis | |
| 6,738,384 B1 | 5/2004 | Chung | |
| 6,851,086 B2 | 2/2005 | Szymanski | |
| 6,993,042 B1 * | 1/2006 | Akatsuka et al. | 370/447 |
| 7,061,999 B2 * | 6/2006 | Chen | 375/340 |
| 7,181,142 B1 * | 2/2007 | Xu et al. | 398/66 |
| 7,327,714 B2 * | 2/2008 | Roh et al. | 370/347 |
| 7,369,768 B2 * | 5/2008 | Sakamoto et al. | 398/58 |
| 7,593,318 B2 | 9/2009 | Reams | |
| 7,710,888 B2 * | 5/2010 | DelRegno et al. | 370/249 |
| 8,503,336 B2 * | 8/2013 | Rappaport et al. | 370/277 |
| 2001/0019558 A1 | 9/2001 | Suzuki et al. | |

(Continued)

FOREIGN PATENT DOCUMENTS

| | | |
|---|---|---|
| EP | 0 921 660 | 2/1999 |
| EP | 0 884 872 | 6/1999 |

(Continued)

*Primary Examiner* — James C Kerveros
(74) *Attorney, Agent, or Firm* — NSIP Law

(57) ABSTRACT

Provided is a method of transmitting an Ethernet frame via a network bridge, the method includes receiving a frame header from a previous node connected to the network bridge; receiving a header cyclic redundancy check (CRC) flag and header CRC with respect to the frame header from the previous node; determining whether to forward the Ethernet frame including the frame header by referring to the header CRC flag and the header CRC; and forwarding the Ethernet frame from the previous node to a next node connected to the network bridge according to the determination.

7 Claims, 11 Drawing Sheets

(56) References Cited

U.S. PATENT DOCUMENTS

| | | |
|---|---|---|
| 2002/0085565 A1 | 7/2002 | Ku et al. |
| 2002/0102097 A1 | 8/2002 | Kobayashi |
| 2003/0128699 A1 | 7/2003 | Reams |
| 2003/0142626 A1* | 7/2003 | Umayabashi et al. ..... 370/236.2 |
| 2003/0172336 A1 | 9/2003 | Sweeney |
| 2004/0071135 A1 | 4/2004 | Jimmei et al. |
| 2005/0128949 A1 | 6/2005 | Ku et al. |
| 2005/0193314 A1* | 9/2005 | Lamy et al. .................. 714/758 |

FOREIGN PATENT DOCUMENTS

| | | |
|---|---|---|
| JP | 2003-258864 | 9/2003 |
| JP | 2004-173114 | 6/2004 |
| JP | 2004-222010 | 8/2004 |
| JP | 2005-278175 | 10/2005 |
| KR | 10-1999-0085640 | 12/1999 |
| KR | 10-0515026 | 9/2005 |

* cited by examiner

METHOD OF TRANSMITTING ETHERNET FRAME IN NETWORK BRIDGE AND THE BRIDGE

CROSS-REFERENCE TO RELATED APPLICATIONS

This application is a divisional application of U.S. patent application Ser. No. 11/591,591, filed on Nov. 2, 2006, now U.S. Pat. No. 7,908,540 B2 which claims the benefit under 35 U.S.C. §119(a) of Korean Patent Application No. 10-2006-0059782, filed on Jun. 29, 2006, in the Korean Intellectual Property Office, the entire disclosure of each of which is hereby incorporated by reference for all purposes.

BACKGROUND

1. Field

The following disclosure relates to a method of transmitting an Ethernet frame in a network bridge. More particularly, the following disclosure relates to a method of transmitting a frame using a check-and-forward technique by using a header CRC flag included in a received Ethernet frame and header CRC.

2. Description of the Related Art

Development of computer network technologies for the Internet has lead to the development of technologies for the general information industry. The developed network technologies opens up new vistas of computing technology, such as providing new services that generate added value to wired or wireless connections between computers.

Network technologies have been rapidly developed and now virtually all computers are connected to a network. Ethernet is an essential aspect of the success of network technologies. Ethernet has been used in numerous types of wired/wireless networks, due to its simple structure.

However, despite Ethernet having been applied to broad fields, Ethernet has not been generally used in time-sensitive and real-time streaming applications, due to a limit of being incapable of supporting isochronous services. Due to a rapid increase of interests in high-quality digital audio-video services, the above limit of the Ethernet has increasingly gained attention. Currently, starting with residential Ethernet, research on Ethernet technology for supporting time-sensitive applications is vigorously being pursued.

A network bridge is an apparatus for transmitting an Ethernet frame between nodes mutually connected via a network. A conventional Ethernet network bridge apparatus supports a frame transmission method generally referred to as a store-and-forward technique. The store-and-forward technique has a switching method in which an entire received Ethernet frame is temporarily stored in a buffer and is forwarded to a next node after a process of detecting an error, such as cyclic redundancy check (CRC), is finished.

Since a considerable amount of time is used in receiving and storing an Ethernet frame and a delay at each node is added to an end-to-end delay. Thus, the above switching method is not suitable for the time-sensitive applications.

Conversely, to solve the problem of excessive delays of the store-and-forward technique, when using a cut-through switching technique in which a frame is directly forwarded by referring to a header of a received Ethernet frame, data included in the frame header, such as a destination address, a source address, and a frame type, is not reliable.

Accordingly, a switching method is needed to secure precision of the frame header data while reducing a time delay due to the forwarding of the frame to support a real-time application.

Also, in a future home network to which real-time applications are applied, digital rights management (DRM) for provided content is an important issue. In one implementation of the DRM, repeated use of content with respect to some applications is limited to a local scope, such as residential scope. In this case, a media server of a content provider has to recognize whether a media player of a content receiver is located within a scope of a certain network distance from a sender of data. However, since a conventional Ethernet bridge apparatus does not support a network distance measurement and a time delay at a bridge apparatus forming each node has a great variance depending upon a traffic state, it is difficult to precisely measure.

SUMMARY

Embodiments provide a network bridge apparatus capable of solving the above problems, effectively supporting time-sensitive and real-time applications, and maintaining compatibility with a conventional Ethernet bridge apparatus.

An aspect of example embodiments is to address at least the above problems and/or disadvantages and to provide at least the advantages described below. Accordingly, an aspect of example embodiments provides a network bridge apparatus suitable for supporting a time-sensitive application and a method of transmitting an Ethernet frame by using the network bridge apparatus.

An aspect of example embodiments also provides a frame transmission method capable of satisfying a time delay of a low level required in a real-time application, by securing precision of data of an Ethernet frame header via a cyclic redundancy check (CRC) header using a header CRC flag included in the Ethernet frame and a header CRC, as well as selectively performing a CRC on an entirety of the Ethernet frame.

An aspect of example embodiments also provides a frame transmission method in which, a function of precisely measuring a distance between a content provider and a content receiver on a network is supported by forwarding a distance measurement frame with a top priority. Accordingly, digital rights management (DRM) with respect to contents provided in real-time may be effectively supported.

An aspect of example embodiments also provides a network bridge apparatus effectively supporting an additional function associated with real-time applications as well as maintaining compatibility with a conventional Ethernet bridge and securing flexibility and expandability of an Ethernet network via the example embodiments.

An aspect of example embodiments also provides a network bridge apparatus in which a state transition counter is compared with a threshold determined by probability computation to make a transition of a state, thereby forwarding a frame more reliably.

According to an aspect of example embodiments, there is provided a method of transmitting an Ethernet frame via a network bridge, the method including: receiving a frame header from a previous node connected to the network bridge; receiving a header cyclic redundancy check (CRC) flag and header CRC with respect to the frame header from the previous node; determining whether to forward the Ethernet frame including the frame header by referring to the header CRC flag and the header CRC; and forwarding the Ethernet frame from the previous node to a next node connected to the network bridge according to the determination.

According to another aspect of example embodiments, there is provided a method of transmitting an Ethernet frame via a network bridge, the method including: receiving the Ethernet frame from a previous node; verifying whether the Ethernet frame is a distance measurement frame for measuring a network distance between a sender and a receiver, by referring to a header of the Ethernet frame; and forwarding the distance measurement frame with a top priority when the Ethernet frame is verified to be the distance measurement frame as a result of the verification.

According to still another aspect of example embodiments, there is provided a network bridge apparatus transmitting an Ethernet frame, the network bridge including: a frame receiving unit receiving the Ethernet frame from a previous node connected to the network bridge; a CRC unit performing a CRC with respect to a header of the Ethernet frame by using a header CRC flag and a header CRC included in the Ethernet frame, or performing the CRC with respect to an entirety of the Ethernet frame by using a CRC field of the Ethernet frame; a state management unit determining an operation state of the network bridge according to a result of the CRC; and a frame transmission unit discarding the received frame or transmitting the received frame to a next node by referring to the operation state and the result of the CRC.

Other features and aspects may be apparent from the following detailed description, the drawings, and the claims.

Figure 1:
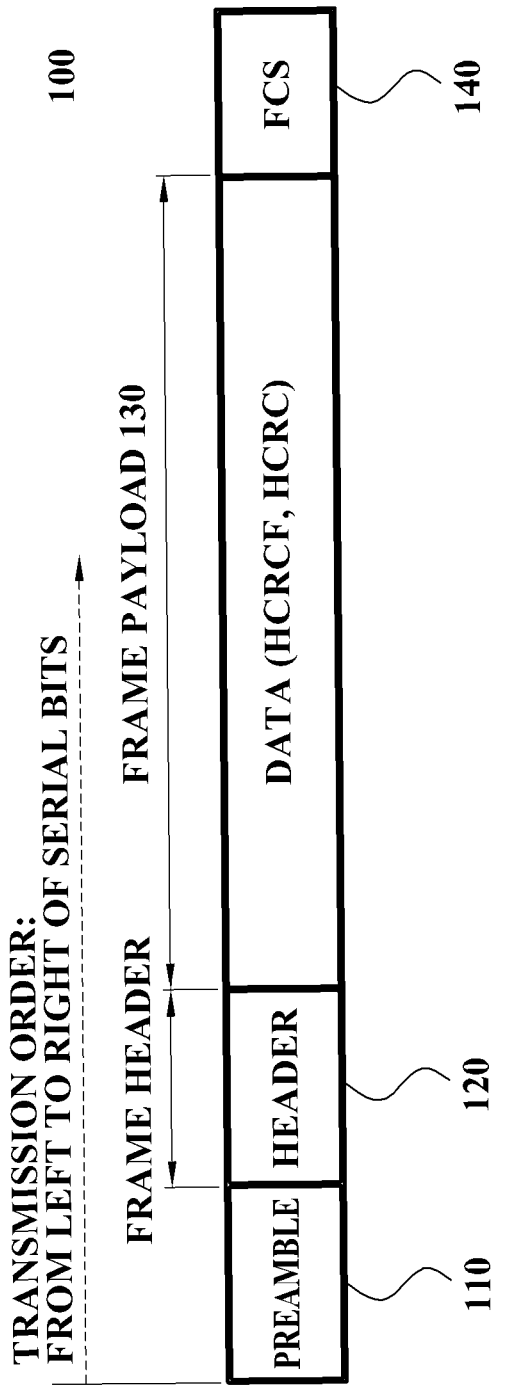
FIG. 1 is a diagram illustrating a configuration of an Ethernet frame according to an example embodiment.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 is a diagram illustrating a configuration of an Ethernet frame 100 according to an example embodiment. The Ethernet frame 100 includes a header 120, a payload 130, and a frame check sequence (FCS) 140.

Also, although not included in the Ethernet frame 100, there is a preamble 110 in the front of the frame header 120 to be used for detecting a frame signal received at a physical layer. The preamble 110 generally includes 7 bytes, and a function of the preamble 110, with respect to an example embodiment, will be described later.

The payload 130 is the part of the Ethernet frame 100 that stores real data and it does not include overhead for use or control of the Ethernet frame 100. As shown in FIG. 1, the payload 130 includes a header CRC flag (HCRCF) and a header CRC (HCRC). The HCRC is CRC bits with respect to the frame header 120, and the HCRCF is an indicator indicating whether to perform CRC on the frame header 120 by using the HCRC.

Conversely, the FCS 140 includes information for detecting an error in the entire Ethernet frame. For example, the FCS 140 may include CRC bits for the entire Ethernet frame. Accordingly, in an example embodiment, "CRC of the entire Ethernet frame" or "CRC of the Ethernet frame" indicates a process of detecting an error within the Ethernet frame by using the CRC bits stored in the FCS 140 located at an end of the Ethernet frame 100, or indicates a result of an error detection.

A network bridge apparatus according to an example embodiment receives the frame first and receives the HCRCF and the HCRC. The bridge apparatus determines the Ethernet frame 100 is to be associated with a real-time application when a value of a header CRC flag is ON and performs an operation of forwarding to reduce a time delay. The bridge apparatus performs CRC on the frame header 120 by using the HCRC. When there is no data error in the frame header as determined by the CRC, the bridge apparatus transmits the Ethernet frame 100 to the next node via an output port. Here, the transmitted Ethernet frame 100 was input before the payload 130 was completely received and includes a data field. When there is a data error in the frame header 120, the Ethernet frame 100 is not transmitted to the next node and is instead discarded. As described above, an example embodiment provides a frame transmission method of a check-and-forward technique in which the CRC on the frame header 120 is performed by using the HCRCF and HCRC. Forwarding of the frame is immediately started without storing an inputted frame when there is no data error.

Conversely, when a value of the HCRCF is OFF, the bridge apparatus determines the inputted Ethernet frame 100 to be a general Ethernet frame and transmits the Ethernet frame 100 to the next node according to a store-and-forward technique. The entire inputted Ethernet frame 100 is received and stored in a buffer and the CRC on the entire Ethernet frame 100 is performed by using the CRC bits of the Ethernet frame 100. When there is no data error in the Ethernet frame 100 as determined by the CRC, the Ethernet frame 100 is transmitted to the next node via the output port. When there is a data error in the Ethernet frame 100 as determined by the CRC, the Ethernet frame 100 is discarded.

The above frame transmission method of the check-and-forward technique according to an example embodiment is a switching method optimized for real-time applications.

Since the check-and-forward technique determines whether to forward or discard by performing the CRC on the frame header 120 instead of performing the CRC on the entire Ethernet frame 100, the operation of forwarding is performed quickly. The check-and-forward technique is beneficial with respect to the real-time applications that require a quick frame forwarding process. Also, when it is determined whether or not to forward, frame bits inputted before receiving the entire Ethernet frame 100 are directly transferred to the output port and transmitted to the next node. Thereby, transmission speed of the Ethernet frame 100 in a network is improved.

In a real-time application, when the payload 130 includes a data error, the entire Ethernet frame 100, including the payload 130, may be transmitted with the error instead of discarding or retransmitting the entire Ethernet frame 100. Namely, in a real-time streaming application, timeliness may be a more important variable than data precision.

Accordingly, in the check-and-forward technique, with respect to a frame whose value of HCRCF is ON, namely, the Ethernet frame 100 associated with a real-time application, regardless of whether there is an error in the entire Ethernet frame 100, when there is no error in the frame header 120, the entire Ethernet frame 100 is forwarded to the next node.

Also, according to the configuration of the Ethernet frame 100, illustrated in FIG. 1, the HCRCF and HCRC are included in the payload 130 instead of added as an additional header, thereby maintaining a uniform size for the entire Ethernet frame 100. Particularly, since the header CRC flag and the header CRC associated with the check-and-forward operation are located in the front of the payload 130, it is quickly determined at a beginning whether to store the rest of data field of the payload 130 in a buffer so as to prevent an unnecessary time delay.

For reference, when the HCRCF and the HCRC occupy 1 byte, respectively, to make the HCRCF and the HCRC included in the payload 130 as shown in FIG. 1, it is required to assume that data stored in the payload 130 is not more than 1498 bytes because 1500 bytes is a maximum payload size. Though most real-time applications may be expected to satisfy the above assumption, when a frame including 1500 bytes and requiring real-time processing is inputted and has to be transmitted by using the check-and-forward technique, the HCRCF and the HCRC may be included in the preamble 110 associated with the Ethernet frame 100 instead of the payload 130.

As described above, the preamble 110 is a field for storing data that is used for detecting a received signal. The preamble 110 includes 7 bytes in the front of the frame header 120. While all 7 bytes of the preamble 110 for signal detection are conventionally used, using all 7 bytes of the preamble 110 for signal detection is now considered to consume an excessive amount of traffic resources, due to development of the physical layer technology.

Accordingly, a part of the preamble 110 is used for storing the HCRCF and the HCRC, according to an example embodiment. According to the present example embodiment, a node receiving an Ethernet frame requiring real-time processing receives a HCRCF and HCRC field stored in 2 bytes of the 7 bytes of the preamble 110 first. The frame header 120 of the Ethernet frame is received, and the Ethernet frame is transmitted by the check-and-forward technique by using the HCRCF and HCRC extracted from the preamble 110.

A Type/Length field located in the front of the frame header 120 is used for identifying a distance measurement frame according to another example embodiment. The identification of the distance measurement frame is performed before transmission in the check-and-forward technique. Accordingly, the node receiving the Ethernet frame 100 receives the type/length field of the frame header 120 first, checks whether the Ethernet frame 100 is the distance measurement frame, and receives the rest of the frame header 120 to perform the transmission in the check-and-forward technique by using the HCRCF and HCRC when the Ethernet frame 100 is not the distance measurement frame, and is a real-time frame requiring the transmission in the check-and-forward technique.

Figure 2:
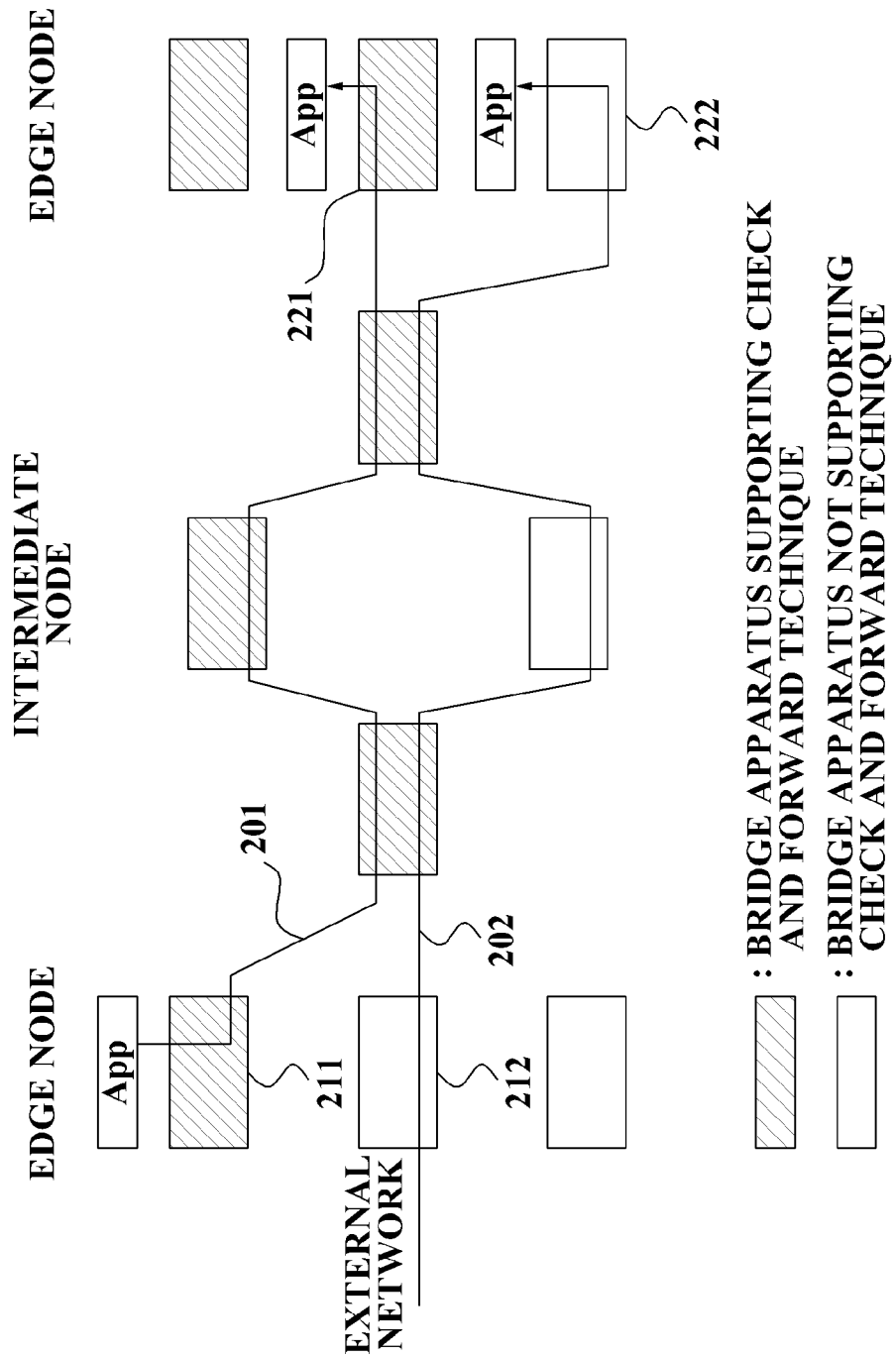
FIG. 2 is a diagram illustrating a configuration of an Ethernet network including a network bridge apparatus according to an example embodiment.

FIG. 2 is a diagram illustrating a configuration of an Ethernet network including a network bridge apparatus operating according to an example embodiment. A residential Ethernet network is an example of the above Ethernet network.

Referring to FIG. 2, a routing path 201 includes bridge apparatus 211 and bridge apparatus 221 that are two edge nodes of the local Ethernet network. Routing path 201 illustrates the transmission of real-time audio or video data from an application of bridge apparatus 211 to an application of bridge apparatus 221.

Conversely, a routing path 202 illustrates an Ethernet frame transmitted from an external network to an application of bridge apparatus 222 via a bridge apparatus 212 that is an edge node of the local Ethernet network and intermediate nodes.

As shown in the routing paths 201 and 202, a bridge apparatus supporting a check-and-forward function may be used together with a bridge apparatus that does not support the check-and-forward function on a network. Accordingly, the frame transmission method according to an example embodiment includes operations that maintain compatibility with a conventional network bridge apparatus as well as providing an improved switching function via the check-and-forward function.

Figure 3:
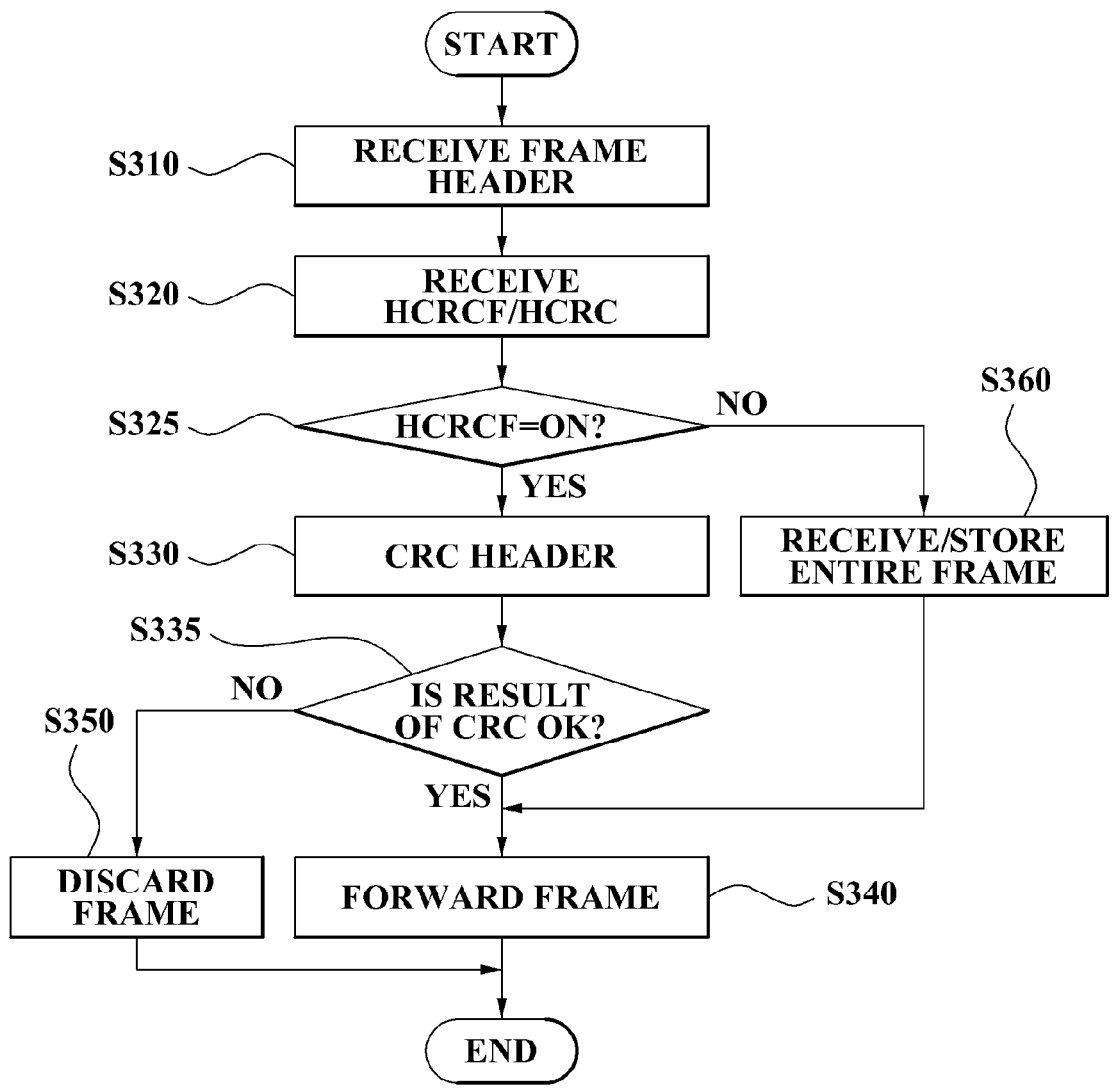
FIG. 3 is a flowchart illustrating a method of transmitting an Ethernet frame, according to an example embodiment.

FIG. 3 is a flowchart illustrating a method of transmitting an Ethernet frame, according to an example embodiment. Referring to FIG. 3, in operations S310 and S320, a frame header and a HCRCF and HCRC are received, respectively. A node connected to a port receiving the frame is called a previous node. In operation S325, it is determined if the value of the HCRCF is "on".

If the value of the HCRCF is "on", in operation S330, a CRC on the frame header is performed. In operation S335, it is determined if the result of the CRC indicates an error. When there is no CRC error, bits of the received frame are forwarded prior to receiving an entire frame in operation S340. When there is a CRC error, the frame is not forwarded to a next node but is discarded in operation S350. In this case, the next node is a node connected to an output port, to which a frame is transmitted.

For reference, the previous node and the next node in the network bridge apparatus are determined according to the direction of transmission of an Ethernet frame. Specifically, the previous node is a node connected to a port that receives the Ethernet frame and the next node is a node connected to a port that transmits the Ethernet frame. Since the network bridge apparatus supports a bidirectional packet flow, positions of the previous node and the next node may be mutually changed according to the direction of the transmission of the frame.

Conversely, when the value of the HCRCF is "off" in operation S325, the bridge apparatus operates in the store-and-forward technique, as described above. Accordingly, in operation S360, the entire Ethernet frame is received and stored. After completion of storage, the received Ethernet frame is forwarded to the next node in operation S340.

As described above, the network bridge apparatus supporting the check-and-forward technique may be used together with the bridge apparatus that does not support the function. Accordingly, the network bridge apparatus determines whether the previous node and the next node supports the check-and-forward technique, respectively, and processes the frame to be transmitted so as to be in a suitable form according to the determination.

Figure 4:
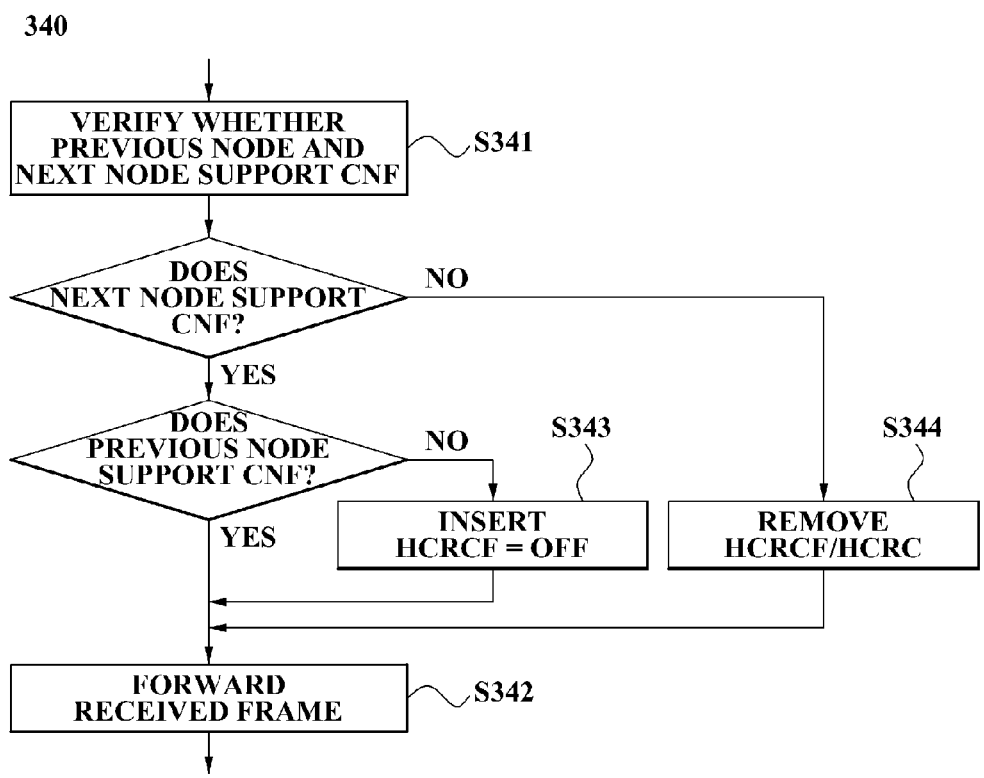
FIG. 4 is a flowchart illustrating an operation of forwarding a frame, illustrated in FIG. 3, in detail.

FIG. 4 is a flowchart illustrating different operations of forwarding a frame S340, wherein the operation chosen to forward the frame depends upon whether the previous node and the next node support the check-and-forward technique. For reference, the term "supporting the check-and-forward technique" used below indicates that the HCRCF and the HCRC included in a payload may be identified.

Referring to FIG. 4, operation S340 of forwarding the Ethernet frame includes sub-operation S341 of verifying whether the previous node and the next node support the check-and-forward technique. When the previous node and the next node support the check-and-forward technique as determined by the verification, in sub-operation S342, the received frame is forwarded as is, without an additional process.

However, when the previous node does not support the check-and-forward technique, the HCRCF and the HCRC are not included in a payload of the received frame. In this case, when the next node also does not support the check-and-forward technique, and the received frame is forwarded without adding the HCRCF and the HCRC. When the next node supports the check-and-forward technique, to prevent a malfunction at the next node, at least the HCRCF is inserted into the received frame to be transmitted. In this case, since the received frame does not include the HCRCF and the HCRC, performing a CRC on a frame header by the next node is meaningless. Accordingly, a value of the HCRCF inserted in to the forwarded frame is established as "off" in operation S343.

Conversely, when the next node does not support the check-and-forward technique, the forwarded frame does not include the HCRCF and the HCRC, regardless of whether the previous node supports the check-and-forward technique. When the previous node supports the check-and-forward technique, the HCRCF and HCRC are removed from the received frame. When the previous node does not support the check-and-forward technique, the received frame is forwarded without adding the HCRCF and HCRC. Since a process of forwarding a frame may be considered as a process of receiving the frame and transmitting a frame formed of bits having an identical value with bits of the received frame, in the detailed description, the claims, and the drawings of the present specification, the two cases are expressed as "removing the HCRCF and the HCRC". The above process is illustrated in operation S344.

Also, although not shown in FIG. 3, the frame transmission method according to an example embodiment may include an operation of verifying whether an Ethernet frame including a frame header is a distance measurement frame by referring to the frame header, immediately after operation S310 of receiving a frame header. In an example embodiment, "the distance measurement frame" indicates a distance between a sender sending an Ethernet frame and a receiver receiving the Ethernet frame on a network and may include a ping frame sent from the sender to the receiver and a responsive ping frame sent from the receiver to the sender.

The sender measures a round-trip time from a point in time of sending the ping frame to a point in time of receiving the responsive ping frame, thereby measuring a network distance between the sender and the receiver. Here, network distance may also be a network latency. In this case, whether the frame is the distance measurement frame such as the ping frame or the responsive ping frame may be verified by using a length/type field of the frame header.

When an inputted frame is the distance measurement frame that is the result of a verification in the above operation, the inputted frame is forwarded to a next node with a top priority. More specifically, when the output port does not transmit a frame and is in an idle state, the distance measurement frame is immediately forwarded. When there is a frame already being transmitted via the output port, the frame already being transmitted is buffered and the distance measurement frame is preferentially forwarded.

To precisely measure a distance between nodes on a network regardless of a traffic state of the network, it is required to specially manage the distance measurement frame. Accordingly, in an example embodiment, as described above, the distance measurement frame has a higher priority than other frames and may preempt transmission resources of the other frames, thereby providing a precise distance measurement result.

Also, the bridge apparatus receiving a ping frame compares a destination address included in the frame header with an Ethernet address of the bridge apparatus and generates and transmits a responsive ping frame to a source address transmitting the ping frame when the two addresses are identical with each other. When the two addresses are not identical with each other, since the ping frame is not destined for the bridge apparatus, the bridge apparatus forwards the ping frame to a next node.

For reference, a sender may include a service provider including a media server and a receiver may include a service receiver including a media player. The service receiver may be a bridge apparatus included in a local Ethernet network supporting a residential Ethernet.

The Ethernet frame transmission method according to an example embodiment may be embodied as a program instruction capable of being executed via various computer units and may be recorded in a computer-readable recording medium. The computer-readable medium may include a program instruction, a data file, and a data structure, separately or cooperatively. The program instructions and the media may be those specially designed and constructed for the purposes of an example embodiment, or they may be of the kind well-known and available to those skilled in the art of computer software arts. Examples of the computer-readable media include magnetic media (e.g., hard disks, floppy disks, and magnetic tapes), optical media (e.g., CD-ROMs or DVD), magneto-optical media (e.g., optical disks), and hardware devices (e.g., ROMs, RAMs, or flash memories, etc.) that are specially configured to store and perform program instructions. The media may also be transmission media such as optical or metallic lines, wave guides, etc. including a carrier wave transmitting signals specifying the program instructions, data structures, etc. Examples of the program instructions include both machine code, such as produced by a compiler, and files containing high-level language codes that may be executed by the computer using an interpreter. The hardware elements above may be configured to act as one or more software modules for implementing the operations of example embodiments.

Figure 5:
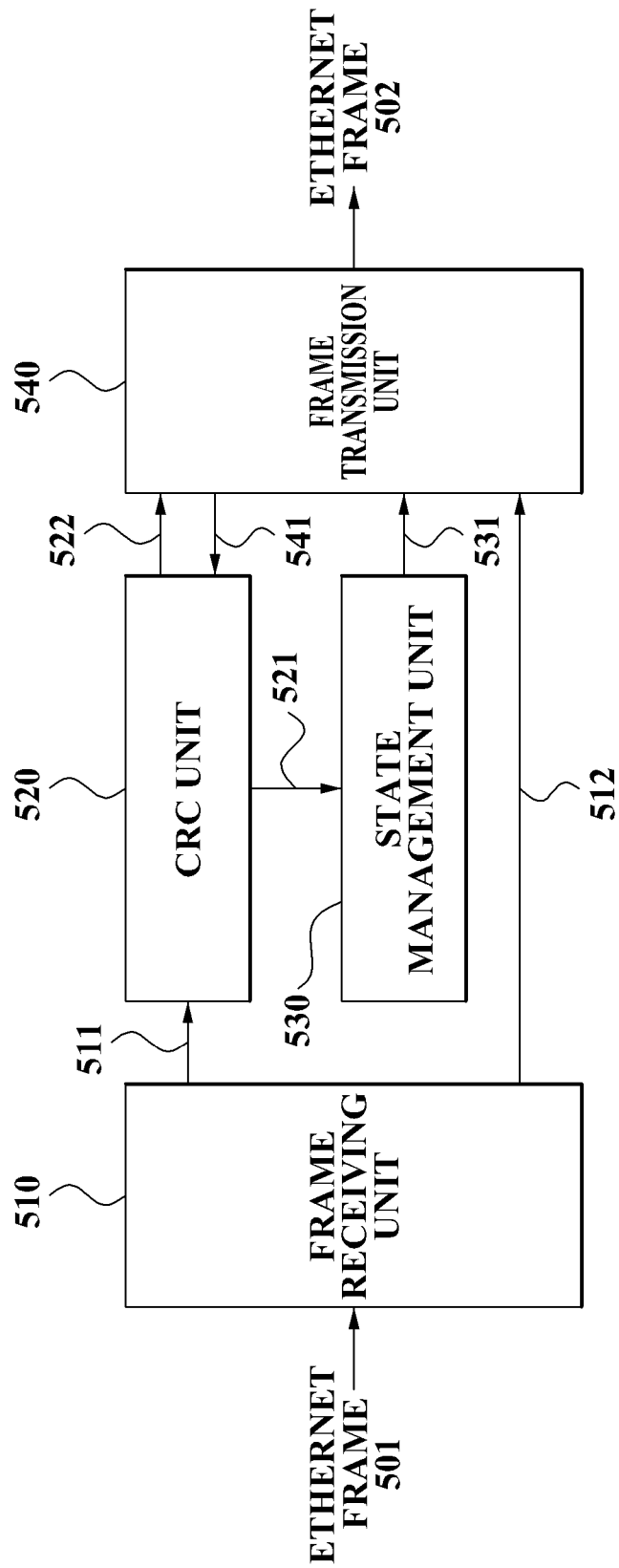
FIG. 5 is a block diagram illustrating an internal configuration of a network bridge apparatus according to an example embodiment.

An aspect of an example embodiment is applied to a network bridge apparatus operating according to the above Ethernet frame transmission method. FIG. 5 is a block diagram illustrating an internal configuration of a network bridge apparatus according to an example embodiment.

Referring to FIG. 5, a frame receiving unit 510 receives an Ethernet frame 501 from a previous node. In detail, the frame receiving unit 510 receives a frame header first and an HCRCF and HCRC located in the front of a frame payload. Data 511 such as the frame header, the HCRCF, and the HCRC is inputted to a CRC unit 520.

The CRC unit 520 performs a CRC on the frame header by using the HCRCF and the HCRC or performs a CRC on an entire Ethernet frame 501 by using a CRC field of the received Ethernet frame 501. Thus, depending upon circumstances, the CRC unit 520 outputs a result of the CRC on the frame header or outputs a result of the CRC on the frame via path 521. The results of the CRC are inputted to a state management unit 530.

The state management unit 530 determines a state of operation according to the results of the CRC. In detail, since the state management unit 530 manages the apparatus by dividing the state of operation into a plurality of states, the apparatus may operate as a finite state machine.

Figure 6:
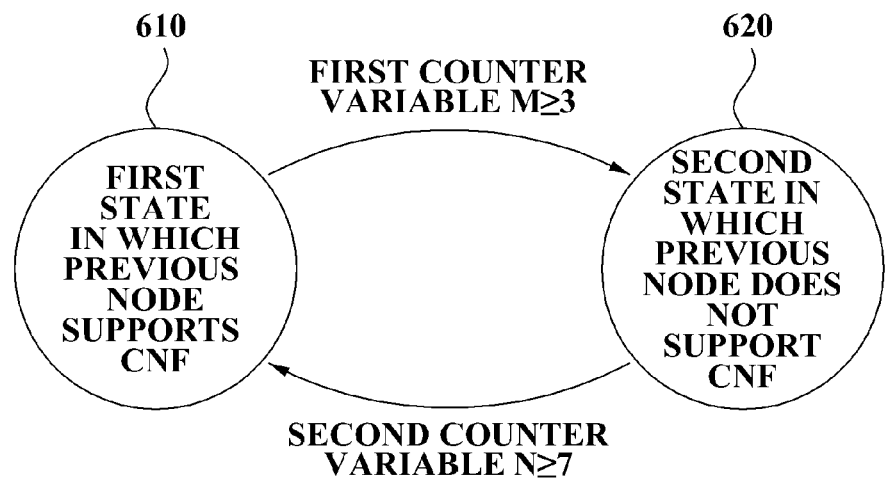
FIG. 6 is a diagram illustrating transition between states maintained and determined by a state management unit.

FIG. 6 is a diagram illustrating transitions between states maintained and determined by the state management unit 530. Referring to FIG. 6, the state of the apparatus includes a first state 610 and a second state 620. The first state 610 indicates a state when a previous node is determined to support the check-and-forward technique. The second state 620 indicates a state when the previous node is determined not to support the check-and-forward technique.

Namely, in the network bridge apparatus, the previous node and a next node connected to the apparatus may vary with a change in a physical connection state and a routing path. Accordingly, the network bridge apparatus does not maintain whether the previous node and the next node support the check-and-forward technique, as a fixed value but has to dynamically determine whether the previous node and the next node support the check-and-forward technique every time by using an Ethernet frame received from the nodes.

Accordingly, the state management unit 530 determines a case in which the previous node is determined to support the check-and-forward technique and a case in which the previous node is determined not to support the check-and-forward technique, to be the first state 610 and the second state 620, respectively. When determination with respect to whether the previous node supports the check-and-forward technique is changed, a state transition is performed. An operation of forwarding the Ethernet frame is performed differently depending upon the state, thereby flexibly performing a coupling with a conventional Ethernet bridge apparatus or a network bridge apparatus according to another example embodiment.

For this, the state management unit 530 maintains or changes a first counter variable M determining whether to perform a transition from the first state 610 to the second state 620 and a second counter variable N determining whether to perform a transition from the second state 620 to the first state 610. As described above, the state management unit 530 accumulates an event that becomes a basis for a state transition and performs a state transition when a result of the accumulation arrives at a threshold. By using the counter variables, when the threshold is suitably selected, optimizing operations of the network bridge apparatus may be more precisely controlled. In FIG. 6, when values of the first counter variable M and the second counter variable N arrive at certain threshold such as 3 and 7,respectively, a state transition is performed. Though not shown, to apply the above threshold, it is required to initialize the first counter variable M and the second counter variable N. The basis for selecting the threshold will be described in detail later.

For reference, in the present specification, for the convenience of the description, the state management unit 530 determines only whether the previous node supports the check-and-forward technique. However, as described above, since an Ethernet frame is bidirectionally transmitted via input and output ports of the network bridge apparatus, the state management unit 530 may determine whether the next node supports the check-and-forward technique, as well as the previous node, and may manage a result of the determination as the state.

Referring back to FIG. 5, the network bridge apparatus includes a frame transmission unit 540 that discards or transmits the received Ethernet frame to the next node by referring to the result of the CRC on the header and the frame, performed by the CRC unit 520, and the state management unit 530 determining the state. For this, the frame transmission unit 540 receives a frame 512 from the frame receiving unit 510. The frame transmission unit 540 communicates with the CRC unit 520 via 522 and 541 and communicates with the state management unit 530 via 531. Further, frame transmission unit 540 outputs Ethernet frame 502.

Figure 7:
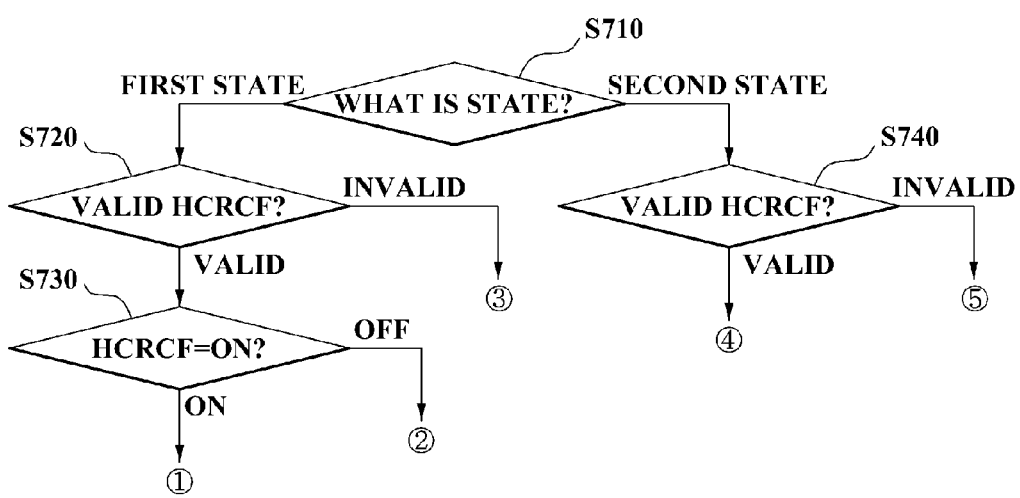
FIG. 7 is a flowchart illustrating operations of a frame transmission unit illustrated in FIG. 5, distinguished according to a state, whether a header CRC flag is valid, and a value of the header CRC flag.
Figure 8:
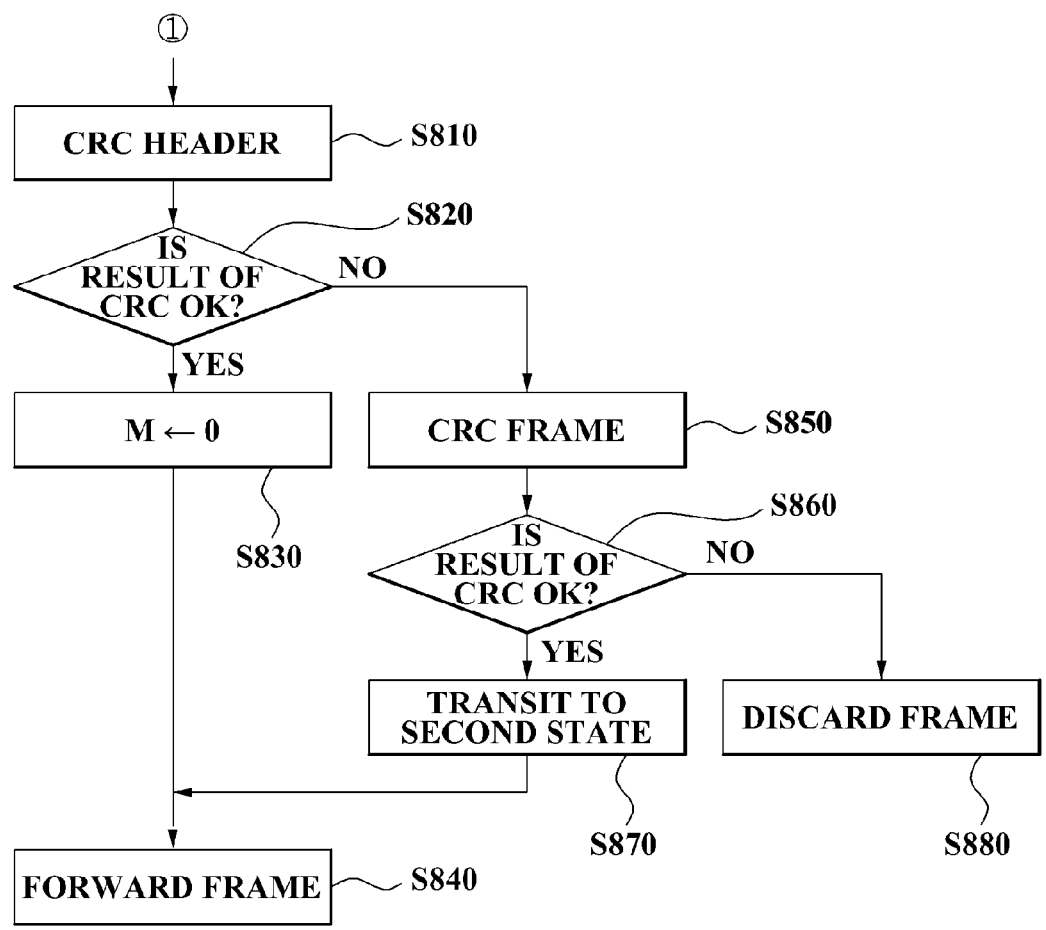
FIG. 8 is a flowchart illustrating operations when the frame transmission unit illustrated in FIG. 7 transmits an Ethernet frame whose header CRC flag value is ON in a first state.
Figure 9:
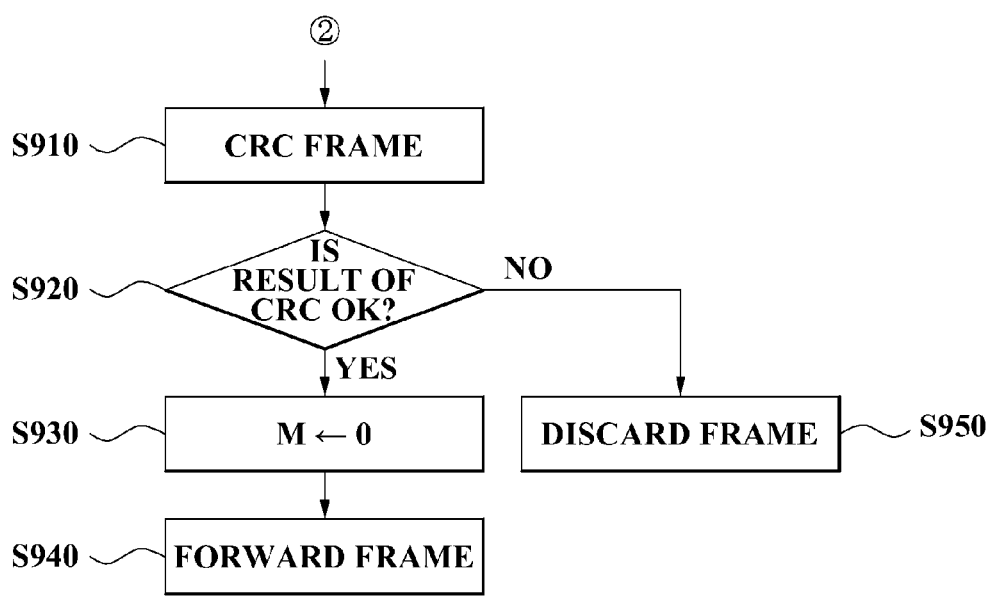
FIG. 9 is a flowchart illustrating operations when the frame transmission unit illustrated in FIG. 7 transmits an Ethernet frame whose header CRC flag value is OFF in the first state.
Figure 10:
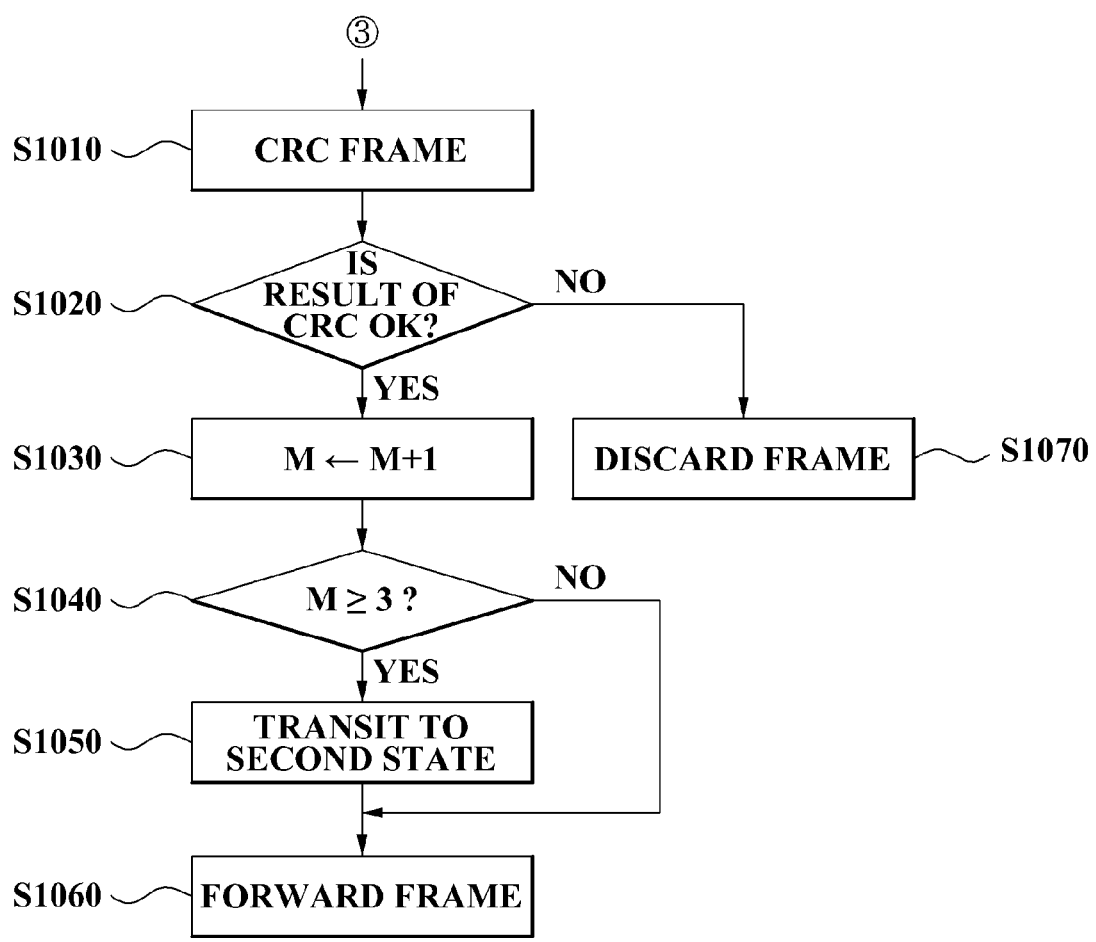
FIG. 10 is a flowchart illustrating operations when the frame transmission unit illustrated in FIG. 7 transmits an Ethernet frame including an invalid header CRC flag in the first state.
Figure 11:
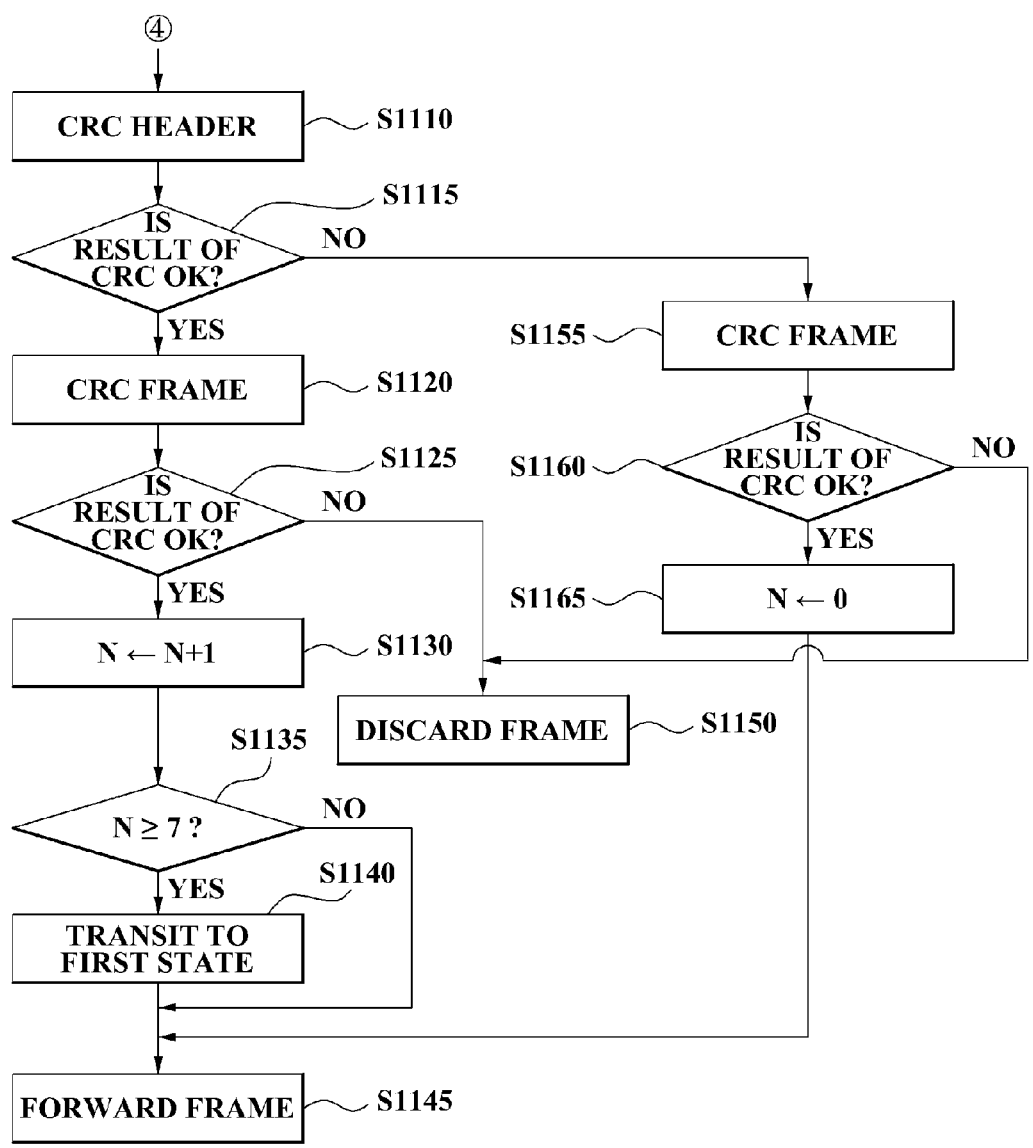
FIG. 11 is a flowchart illustrating operations when the frame transmission unit illustrated in FIG. 7 transmits an Ethernet frame including a valid header CRC flag in a second state.
Figure 12:
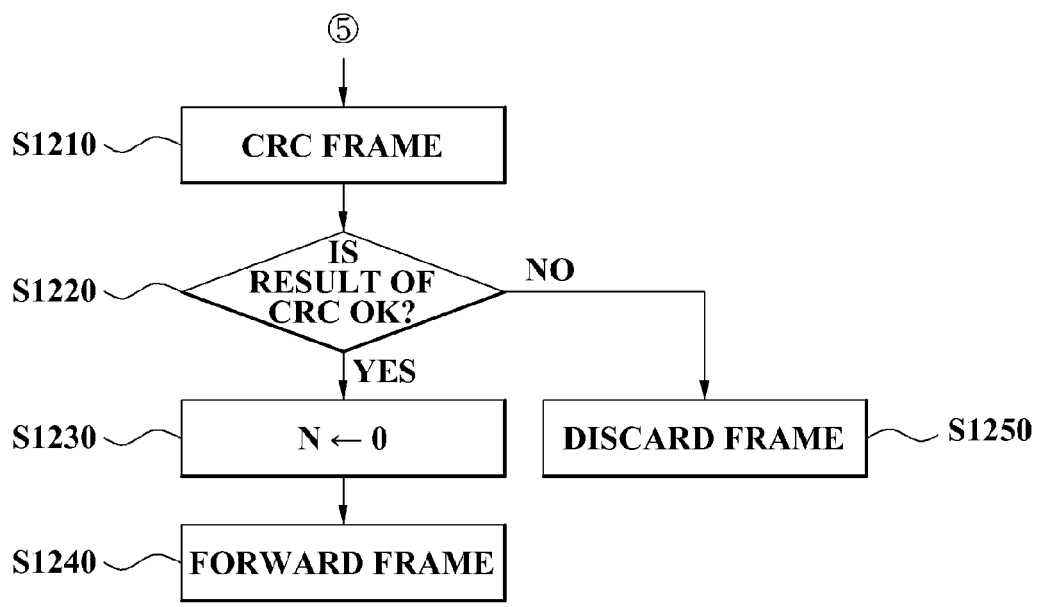
FIG. 12 is a flowchart illustrating operations when the frame transmission unit illustrated in FIG. 7 transmits an Ethernet frame including an invalid header CRC flag in the second state.

FIG. 7 is a flowchart illustrating operations of the frame transmission unit 540, distinguished according to the state, for determining whether a HCRCF is valid, and a value of the HCRCF. In operation S710, the frame transmission unit 540 determines if the state of operation is the first state or the second state. If the state of operation is the first state, the frame transmission unit 540 determines, in operation S720, if the HCRCF is valid or invalid. The operations for the HCRCF being invalid are illustrated in FIG. 10. However, if HCRCF is valid, the frame transmission unit 540 determines, in operation S730, if the HCRCF is ON or OFF. The operations for the HCRCF being OFF are illustrated in FIG. 9 and the operations for the HCRCF being ON are illustrated in FIG. 8. Returning to operation S710, if the state of operation is the second state, the frame transmission unit 540 determines, in operation S740, if the HCRCF is valid or invalid. The operations for the HCRCF being invalid are illustrated in FIG. 12 and the operations for the HCRCF being valid are illustrated in FIG. 11. The operations of the frame transmission unit 540 with respect to the distinguished cases shown in FIG. 7 are illustrated in FIGS. 8 through 12.

For reference, the HCRCF may be expressed via a plurality of bits. For example, when using 8 bits, a binary number "10101011" may be used for designating "on" and a binary number "01010100" may be used for designating "off". When the received HCRCF includes another bit stream in addition to the above two, the HCRCF is invalid and therefore a value of the HCRCF may not be determined to be "on" or "off".

FIG. 8 is a flowchart illustrating operations when the frame transmission unit 540 transmits an Ethernet frame whose HCRC value is ON in the first state 610 as determined in operation S730 of FIG. 7. In the first state 610 it may be expected that an inputted frame includes a valid HCRCF because a previous node supports the check-and-forward technique. In operation S810, a CRC on the frame header is determined and is performed by the CRC unit 520. When there is no error in a frame header as determined by a CRC on the frame header and since a frame desired by the first state 610 is received, the state management unit 530 does not change a state. Also, since the above result of the CRC becomes a strong basis for maintaining a present state, the state management unit 530 initializes a first state transition counter variable (M) for the first state 610, associated with the transition to the second state 620, as 0 in operation S820. The state management unit 530 then enables the frame transmission unit 540 to forward the frame to a next node in operation S830.

On the other hand, when there is an error in the frame header as determined in operation S820 based on the result of the CRC, a CRC on the entire frame is performed in operation S850 and a result of the CRC is evaluated in operation S860. When there is no CRC error in the frame, the state management unit 530 transitions the state of the network bridge apparatus to the second state 620 in operation S870 and then enables the frame transmission unit 540 to forward the frame in operation S840. Here, despite the previous node having transmitted a general Ethernet frame not including an HCRCF and HCRC, the HCRCF has a value identical with a valid bit stream by a mere chance. When there is CRC error in the frame, the frame is discarded in operation S880.

FIG. 9 is a flowchart illustrating operations when the frame transmission unit 540 transmits an Ethernet frame whose HCRC value is OFF in the first state 610 as determined in operation S730 of FIG. 7. In this case, since there is a node not supporting the check-and-forward technique in a network path, the check-and-forward function cannot be used on the entire end-to-end path. In this case, the CRC unit 520 does not separately perform a CRC on a frame header and only performs a CRC on the entire frame in operation S910. A result of the CRC is evaluated in operation S920.

When there is no CRC error in the frame as determined in operation S920 based on the result of the CRC, and since the present state is maintained, the state management unit 530 initializes a value of the first state transition counter variable (M) to be 0 in operation S930. The frame transmission unit 540 then forwards the frame to a next node in operation S940. However, when there is a CRC error in the frame, as determined in operation S920, the state management unit 530 discards the frame in operation S950.

FIG. 10 is a flowchart illustrating operations when the frame transmission unit 540 transmits an Ethernet frame including an invalid HCRCF in the first state 610 as determined in operation S720 of FIG. 7. When the HCRC is invalid, the CRC unit 520 performs CRC on an entire frame in operation S1010 and a result of the CRC is evaluate in operation S1020. When there is a CRC error in the frame, the frame is discarded in operation S1070. However, when there is no CRC error in the frame, the frame may be determined to be valid and does not include a HCRCF and HCRC. Accordingly, the state management unit 530 increases a value of the first state transition counter variable (M) by 1 in operation S1030. In operation S104o it is determined if the first state transition counter M is equal to or greater than 3. When the first state transition counter M is three or greater the state management unit 530 performs a transition to the second state 620 in operation S1050. After the transition to the second state 620 or a determination that M is less than 3, the frame transmission unit 540 then performs an operation of forwarding in operation S1060.

FIG. 11 is a flowchart illustrating operations when the frame transmission unit 540 transmits an Ethernet frame including a valid HCRCF in the second state 620 as determined in operation S740 of FIG. 7. As shown in FIG. 11, in this case, the state management unit 530 may perform a CRC on a frame header in operation S1110 and evaluate a result of the CRC in operation S1115.

When there is CRC error in the frame header, the state management unit 530 may perform a CRC on the frame in operation S1155 and the result is evaluated in operation S1160. If there is a CRC error in the frame, the frame is discarded in operation S1150. However, if there is no CRC error, a value of a second state transition counter variable (N) is set to 0 in operation S1165, thereby maintaining the current state. The frame transmission unit 540 then performs an operation of forwarding in operation S1145.

When there is no CRC error in the frame header, the state management unit 530 may perform a CRC on the frame in operation S1120 and the result is evaluated in operation S1125. If there is a CRC error in the frame, the frame is discarded in operation S1150. Here, the value of the second state transition counter variable (N) is not changed by the state management unit 530. If there is no CRC error in the frame, the frame is discarded in operation S1150 the value of a second state transition counter variable (N) is increased by 1 in operation S1130 to perform a transition to the first state 610. When the second state transition counter variable (N) becomes 7 as determined in operation S1135, the state management unit 530 performs a state transition of the network bridge apparatus to the first state 610 in operation S1140 and the frame transmission unit 540 performs an operation of forwarding in operation S145 that is suitable for the state transition. However, if the second state transition counter variable (N) is less than 7 in operation S1135, the frame transmission unit 540 performs an operation of forwarding in operation S1145.

FIG. 12 is a flowchart illustrating operations when the frame transmission unit 540 transmits an Ethernet frame including an invalid HCRCF in the second state 620 as determined in operation S740 of FIG. 7. In this case, the CRC unit 520 performs a CRC on the entire frame in operation S1210 and evaluates a result of the CRC in operation S1220. When there is no CRC error in the entire, the state management unit 530 initializes a value of the second state transition counter variable (N) to be 0 in operation S1230. Thereby the current state is maintained. Accordingly, the frame transmission unit 540 forwards the frame in operation S1240. However, when there is a CRC error in the frame, the frame transmission unit 540 discards the frame in operation S1250.

In the operations of the frame transmission unit 540, described referring to FIGS. 7 through 12, the operation of forwarding a frame is performed differently depending upon the states of a previous node and a next node. Namely, when the states of the previous node and the next node are the first state 610, the frame transmission unit 540 transmits the frame as is to the next node. Conversely, when the state of the next node is the second state 620, the frame transmission unit 540 removes a HCRCF and HCRC of the received frame and transmits the frame to the next node. Also, when the state of the previous node is the second state 620 and the state of the next node is the first state 610, the frame transmission unit 540 inserts an HCRCF in the received frame, establishes a value of the inserted HCRCF to be "off", and transmits the frame to the next node.

According to the above example embodiment, the threshold associated with a transition of the state is determined to be not less than 3, with respect to a transition from the first state 610 to the second state 620. The threshold is determined to be not less than 7, with respect to a transition from the second state 620 to the first state 610. The above threshold is determined based on a probability computation result as follows.

It is assumed that a Poisson error whose bit error rate (BER) is $10^{-8}$, regardless of whether there is an error in one bit of a HCRCF with respect to 3 sequential frames. A probability of a transition to the second state is computed as $(8\times10^{-8})^3=5.12\times10^{-22}$. In a worst case, specifically, with respect to a minimized frame of 512 bits in an ultrahigh speed Ethernet network environment, the above BER indicates an incorrect state transition occurs once in $512\times10^{-10}/5.12\times10^{-22}=10^{14}s=3\times10^{-6}$ years. Accordingly, when the threshold of the state transition from the first state 610 to the second state 620 is determined to be not more than 3, a stable function may be secured.

Next, a minimized threshold 7 associated with the transition from the second state 620 to the first state 610 will be described. When assuming that frame data includes a random bit pattern, a probability of an error in the transition may be computed as $2^{-56}=1.39\times10^{-17}$. In a worst case, the BER indicates an incorrect state transition occurs once in $512\times10^{-10}/1.39\times10^{-17}=117$ years. Accordingly, the threshold of the state transition from the second state 620 to the first state 610 is determined to be not less than 7, thereby providing a stable function.

A network bridge apparatus according to another example embodiment may further include a distance measurement frame verification unit (not shown) verifying whether an Ethernet frame is a distance measurement frame. The distance measurement frame verification unit may verify whether the received frame is transmitted to measure a network distance, by using a length/type field of a frame header of the received frame.

When the received frame is the distance measurement frame as a result of a verification performed by the distance measurement frame verification unit, the frame transmission unit 540 forwards the distance measurement frame with a top priority. For this, the network bridge apparatus according to the present example embodiment includes a frame buffer. Namely, with respect to the Ethernet frame determined to be the distance measurement frame, the frame transmission unit 540 verifies whether an output port is an idle state, immediately forwards the distance measurement frame when the output port is the idle state, temporarily stores a frame currently being transmitted in the frame buffer when the frame is currently being transmitted via the output port, and preferentially transmits the distance measurement frame.

Hitherto, referring to FIGS. 5 through 12, the network bridge apparatus according to an example embodiment has been described. Since detailed contents of the example embodiments described referring to FIGS. 1 through 4 can be applied to the network bridge apparatus according to an example embodiment, hereinafter, description of detailed contents associated with the network bridge apparatus will be omitted.

An aspect of example embodiments also provides a frame transmission method capable of satisfying a requirement for reduced time delay required in a real-time application, by securing precision of data of an Ethernet frame header via a CRC header using a header CRC flag included in the Ethernet frame and a header CRC as well as selectively performing CRC on an entire Ethernet frame.

According to an aspect of example embodiments, a function of precisely measuring a distance between a content provider and a content receiver on a network is also supported by forwarding a distance measurement frame with a top priority. Accordingly, digital rights management (DRM) with respect to contents provided in real-time may be effectively supported.

According to an aspect of example embodiments, an additional function associated with real-time applications is also effectively supported. Further, compatibility with a conventional Ethernet bridge apparatus is maintained. Also, via this, flexibility and expandability of an Ethernet network may be secured in a residential Ethernet.

According to an aspect of example embodiments, in embodying the network bridge apparatus, a state transition counter is compared with a threshold determined by probability computation to perform a transition of a state, thereby more precisely forwarding a frame.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of transmitting an Ethernet frame via a network bridge, the method comprising:
   receiving the Ethernet frame from a previous node;
   verifying whether the Ethernet frame is a distance measurement frame for measuring a network distance between a sender and a receiver, by referring to a header of the Ethernet frame; and
   forwarding the distance measurement frame with a top priority when the Ethernet frame is verified to be the distance measurement frame as a result of the verification.

2. The method of claim 1, wherein the forwarding the distance measurement frame comprises buffering the Ethernet frame being currently transmitted and preferentially forwarding the distance measurement frame, when an Ethernet frame being currently transmitted to a next node exists.

3. The method of claim 1, wherein the forwarding the distance measurement frame comprises forwarding the distance measurement frame to a source address of the distance measurement frame when an address of the network bridge is identical with a destination address of the distance measurement frame.

4. The method of claim 1, wherein the distance measurement frame comprises at least one of a ping frame transmitted from a service provider to a service receiver and a responsive ping frame transmitted from the service receiver to the service provider in response to the ping frame.

5. The method of claim 4, wherein the service provider comprises a media server and the service receiver comprises a media player.

6. The method of claim 1, wherein the Ethernet frame supports residential Ethernet.

7. A non-transitory computer-readable medium configured to record a program which, when executed by a computer, causes the computer to execute a method of transmitting an Ethernet frame via a network bridge, comprising:

receiving the Ethernet frame from a previous node;
verifying whether the Ethernet frame is a distance measurement frame for measuring a network distance between a sender and a receiver, by referring to a header of the Ethernet frame; and
forwarding the distance measurement frame with a top priority when the Ethernet frame is verified to be the distance measurement frame as a result of the verification.

\* \* \* \* \*